Patented Feb. 6, 1934

1,946,010

UNITED STATES PATENT OFFICE

1,946,010

AZO-DYESTUFF AND PROCESS OF MAKING SAME

Gérald Bonhôte, Basel, Switzerland, assignor to firm Society of Chemical Industry in Basle, Basel, Switzerland No Drawing. Application May 8, 1933, Serial No. 670,034, and in Switzerland May 10, 1932

11 Claims.  (Cl. 260—95)

The present invention relates to the manufacture of new azo-dyestuffs and comprises the process of making these azo-dyestuffs and the new products themselves.

According to this invention valuable new dyestuffs are made by coupling an arylide of 2:3-hydroxynaphthoic acid with a diazotized aryl- or aralkyl-ether of an ortho-aminophenol which contains a carboxylic acid ester group. The dyestuffs are yellowish, scarlet-red to blue-red powders which dissolve in pyridine to yellow-red to blue-red solutions. They correspond to the general formula

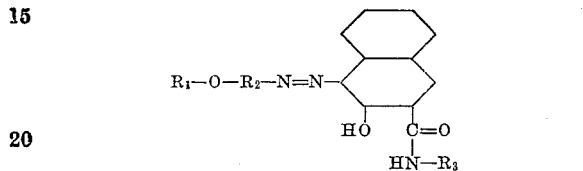

wherein $R_1$ stands for a nucleus of the benzene series or an aralkyl radical, $R_2$ for an aryl nucleus of the benzene series in which the oxygen atom and the nitrogen atom of the two substituents of the benzene nucleus $R_2$ stand in ortho-position to each other, $R_3$ for an aryl nucleus of the benzene or naphthalene series, and finally wherein at least one of the two radicals $R_1$ and $R_2$ contains a COOX group in which X means alkyl, aralkyl or aryl.

The same tints are produced by the dyestuffs on the fiber and the dyeings are characterized by extraordinary brightness and advantageous properties of fastness, particularly to chlorine and kier-boiling.

The diazotizing components coming into question may, when the carboxylic acid ester group is in the ortho-aminophenol residue, be made quite generally by reducing the condensation product obtainable from compounds like the alkyl-, aralkyl- or aryl esters of 2-nitro-1-chlorobenzene-4- or 5-carboxylic acid and phenol or its nuclear substitution products, such as ortho-, para- or meta-cresol, ortho-, para- or meta-chloro-phenol, chloro-cresols, dichloro-phenols, bromo- or iodo-phenols, mono-alkyl-ethers of hydroquinone, resorcinol or pyrocatechol, chloroguaiacol, naphthols, benzyl-alcohol or the like. They may also be made by condensation of the 2-nitro-1-chlorobenzene-4- or 5-carboxylic acid with the aforesaid phenol and then esterifying and reducing the condensation product. Such products are also obtainable in other ways, for instance by condensing a suitable ortho-nitrophenol-carboxylic acid ester, such as 1-hydroxy-2-nitrobenzene-4-carboxylic acid-methyl-, ethyl-, propyl-, butyl-, amyl-, or phenyl-ester, with benzyl-chloride and reducing the condensation product.

When the carboxylic acid ester group is in the aryl- or aralkyl-residue of the aryl- or aralkyl-ether of the ortho-aminophenol, the compounds may be made, for example, in the following manner: 1-halogen-2-nitrobenzene or 1-halogen-2-nitro-4- or 5-halogen-benzene is condensed with a phenol-carboxylic acid, such as ortho-, para- or meta-hydroxybenzenecarboxylic acid or a nuclear substitution product thereof, for instance a cresol-carboxylic acid, a chloro-phenol-carboxylic acid or the like, and then esterifying the carboxylic acid group of the condensation product and reducing the nitro-group. The procedure may also be such that the nitro-group of the condensation product is first reduced and then the reduced product is esterified in the carboxylic acid group.

The following examples illustrate the invention, the parts being by weight:—

Example 1

25.7 parts of the ethyl ester of 2-amino-4-carboxylic acid-1:1'-diphenylether are diazotized in the usual manner. The clear diazo-solution is introduced into a solution consisting of 31.3 parts of 2:3-hydroxynaphthoic acid-2'-naphthalide, 95 parts of sodium hydroxide solution of 30 per cent. strength, 15 parts of crystallized sodium acetate and 3000 parts of water. The red dyestuff produced separates immediately. It is filtered and dried. The new product forms a red powder which dissolves in pyridine to red solutions. It corresponds to the formula

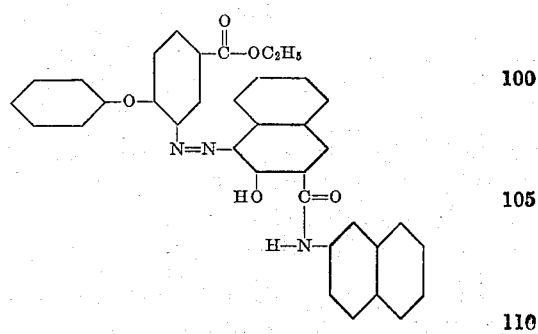

Example 2

25.5 parts of the methyl ester of 2-amino-4-chloro-1:1'-diphenylether-4'-carboxylic acid are diazotized in the usual manner. The clear diazo-solution thus obtained is introduced into a solution consisting of 29.3 parts of 2:3-hydroxynaphthoic acid-ortho-anisidide, 60 parts of sodium hydroxide solution of 30 per cent. strength, 15 parts of calcined sodium carbonate and 2000 parts of water. The red dyestuffs thus formed separates immediately and is filtered and dried. The new product forms a red powder which dissolves in pyridine to red solutions. It corresponds to the formula

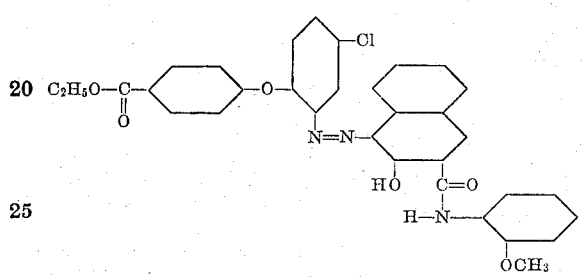

Example 3

Cotton yarn is impregnated with a grounding liquor made by dissolving 5 grams of 2:3-hydroxynaphthoic acid - 2'- methoxy-5'-methyl-anilide in 300 cc. of hot water with addition of 10 cc. of sodium hydroxide solution of 30 per cent. strength and 10 cc. of Turkey red oil, and then diluting the whole to 1 litre. The goods are then wrung out and developed in a solution neutralized with sodium acetate containing per litre 2 grams of the diazotized ethyl-ester of 4'-chloro-2-amino - 4 - carboxylic acid-1:1'-diphenyl - ether. There is produced a very pure alizarine red of very good fastness to washing, chlorine, kier-boiling and light. The new dyestuff corresponds to the formula

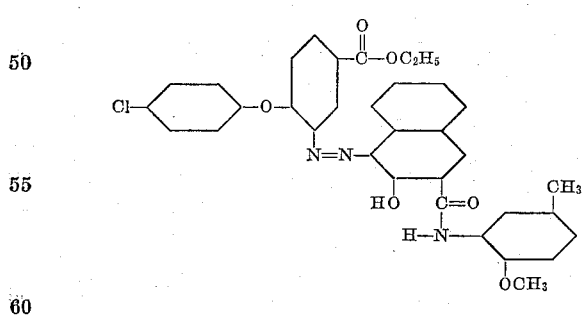

Example 4

Cotton yarn is impregnated with a grounding liquor made by dissolving 7 grams of 2:3-hydroxynaphthoic acid-paratoluidide in 500 cc. of hot water with addition of 14 cc. of sodium hydroxide solution of 30 per cent. strength and 10 cc. of Turkey red oil and diluting the whole to 1 liter. The goods are then wrung out and developed in a solution neutralized with sodium acetate and containing per liter 2.5 grams of the ethyl ester of 2-amino-4-chloro-1:1'-diphenyl-ether-4'-carboxylic acid. There is produced a scarlet-red dyeing of excellent properties of fastness. The new dyestuff corresponds to the formula

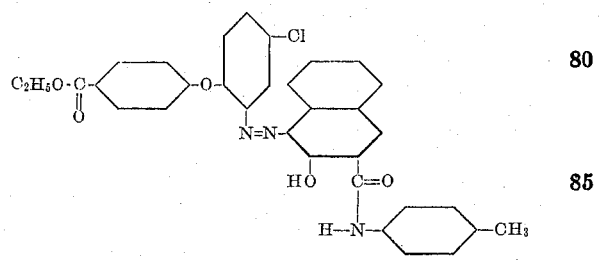

Example 5

Cotton yarn is impregnated with a solution of 7 grams of 2:3-hydroxynaphthoic acid-4'-ethoxy-anilide, 14 cc. of sodium hydroxide solution of 30 per cent. strength and 10 cc. of Turkey red oil per liter, then well wrung out and developed in a diazo-solution neutralized with sodium acetate and containing per liter 2 grams of the ethyl ester of 2':5'-dichloro-2-amino-4-carboxylic acid-1:1'-diphenylether, and then rinsed and soaped. There is obtained a very pure scarlet tint of excellent properties of fastness. The new dyestuff corresponds to the formula

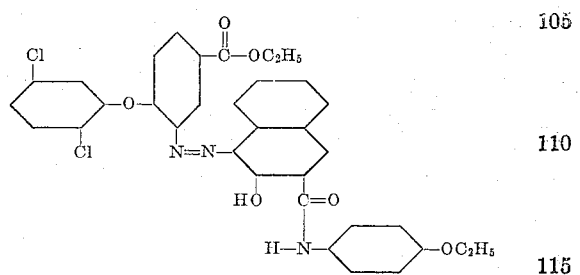

Example 6

The material to be printed is foularded with an alkaline solution containing per liter 12 grams of 2:3-hydroxynaphthoic acid-anilide. After drying it is printed with a printing color which contains per kilogram 8 grams of the diazotized ethylester of 2-amino-4-chloro-1:1'-diphenyl-ether-3'-carboxylic acid. The deep, pure, yellowish scarlet dyeing develops quickly and is very fast. The new dyestuff corresponds to the formula

Example 7

Cotton yarn is soaked at 25–30° C. in 25 times its weight of a solution containing per liter 5 grams of 2:3-hydroxynaphthoic acid-1'-naphthalide, 10 cc. of sodium hydroxide solution of 30 per cent. strength, 10 cc. of Turkey red oil and 5 cc. of formaldehyde of 40 per cent. strength. The yarn is then well wrung out and developed in a neutralized solution containing per liter 2 grams of diazotized ethyl-ester of 4'-chloro-2-amino-4-carboxylic acid-1:1'-diphenyl-ether. Rinsing and soaping follow. There is obtained a very pure alizarine red tint of excellent fastness to washing, chlorine, kier-boiling and light. The new dyestuff corresponds to the formula

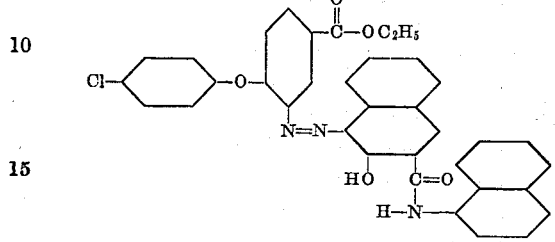

Example 8

Cotton yarn is grounded with a solution prepared by dissolving 7 grams of the 2:3-hydroxy-naphthoic acid-2'-methyl-anilide in 300 cc. of hot water, adding 14 cc. of a sodium hydroxide solution of 30 per cent. strength, 10 cc. of Turkey red oil and diluting the whole to 1 liter. The yarn is then wrung out and the dyestuff developed in a solution neutralized with sodium acetate and containing per liter 2 grams of the diazotized methyl ester of 4'-chloro-2-amino-1:1'-diphenylether-4-carboxylic acid. There is thus obtained a very pure scarlet-red tint of excellent fastness properties. The formula of the new dyestuff is

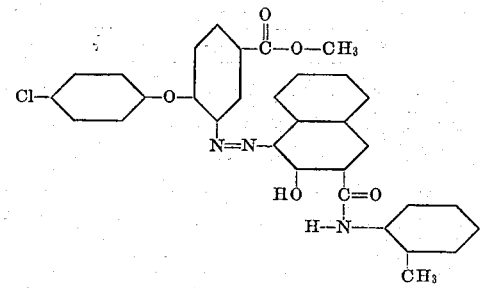

The following table indicates the tints obtained by a number of other dyestuffs made according to this invention and applied to cotton or regenerated cellulose:—

|   | Diazo-component. | Coupling-component. | Shade |
|---|---|---|---|
| 1 | Ethyl-ester of 2-amino-4-carboxylic acid-1:1'-diphenylether | 2:3-hydroxynaphthoic acid-2'-methoxy anilide | Red |
| 2 | Do | 2:3-hydroxynaphthoic acid-1'-naphthalide | Scarlet |
| 3 | Do | 2:3-hydroxynaphthoic acid-2':5'-dimethoxyanilide | Do. |
| 4 | Do | 2:3-hydroxynaphthoic acid-2'-methyl-4'-methoxyanilide | Red |
| 5 | Do | 2:3-hydroxynaphthoic acid-2'-chloranilide | Alizarine-red |
| 6 | Do | 2:3-hydroxynaphthoic acid-3'-chloranilide | Red |
| 7 | Do | 2:3-hydroxynaphthoic acid-2'-methyl-5'-chloranilide | Scarlet |
| 8 | Ethyl ester of 2'-chloro-2-amino-4-carboxylic acid-1:1'-diphenylether | 2:3-hydroxynaphthoic acid-1'-naphthalide | Scarlet |
| 9 | Do | 2:3-hydroxynaphthoic acid-4'-methoxyanilide | Yellowish-scarlet |
| 10 | Do | 2:3-hydroxynaphthoic acid-2'-methoxyanilide | Red |
| 11 | Do | 2:3-hydroxynaphthoic acid-2'-naphthalide | Scarlet |
| 12 | Do | 2:3-hydroxynaphthoic acid-2'-chloranilide | Red |
| 13 | Do | 2:3-hydroxynaphthoic acid-3'-methylanilide | Scarlet |
| 14 | Ethyl ester of 3'-methyl-2-amino-4-carboxylic acid-1:1'-diphenylether | 2:3-hydroxynaphthoic acid-2'-methoxyanilide | Scarlet-red |
| 15 | Do | 2:3-hydroxynaphthoic acid-2'-methoxy-5'-chloranilide | Scarlet |
| 16 | Do | 2:3-hydroxynaphthoic acid-2'-methoxy-5'-methylanilide | Scarlet |
| 17 | Ethyl ester of 4'-chloro-2-amino-4-carboxylic acid-1:1'-diphenyl ether | 2:3-hydroxynaphthoic acid 4'-ethoxyanilide | Scarlet |
| 18 | Do | 2:3-hydroxynaphthoic acid-anilide | Scarlet |
| 19 | Do | 2:3-hydroxynaphthoic acid-2'-methyl-4'-chloranilide | Red |
| 20 | Do | 2:3-hydroxynaphthoic acid-2'-naphthalide | Scarlet |
| 21 | Do | 2:3-hydroxynaphthoic acid-2':4'-dimethylanilide | Red |
| 22 | Do | 2:3-hydroxynaphthoic acid-2':5'-dimethylanilide | Red |
| 23 | Do | 2:3-hydroxynaphthoic acid-2':5'-dimethoxyanilide | Alizarine-red |
| 24 | Do | 2:3-hydroxynaphthoic acid-2'-ethoxy-5'-methylanilide | Do. |
| 25 | Ethyl ester of 4'-methyl-2-amino-4-carboxylic acid-1:1'-diphenylether | 2:3-hydroxynatphthoic acid-1'-naphthalide | Do. |
| 26 | Do | 2:3-hydroxynaphthoic acid-4'-ethoxyanilide | Scarlet |
| 27 | Do | 2:3-hydroxynaphthoic acid-2'-methoxyanilide | Scarlet-red |
| 28 | Do | 2:3-hydroxynaphthoic acid-2'-methyl-4'-methoxyanilide | Red |
| 29 | Do | 2:3-hydroxynaphthoic acid-3'-methylanilide | Red |
| 30 | Do | 2:3-hydroxynaphthoic acid-3'-chloranilide | Red |
| 31 | Do | 2:3-hydroxynaphthoic acid-4'-chloranilide | Red |
| 32 | Do | 2:3-hydroxynaphthoic acid-2'-methoxy-5'-chloranilide | Scarlet |
| 33 | Do | 2:3-hydroxynaphthoic acid-2':4'-dimethylanilide | Alizarine-red |
| 34 | Do | 2:3-hydroxynaphthoic acid-2':5'-dimethylanilide | Red |
| 35 | Ethyl ester of 2':5'-dichloro-2-amino-4-carboxylic acid-1:1'-diphenyl ether | 2:3-hydroxynaphthoic acid-1'-naphthalide | Red |
| 36 | Do | 2:3-hydroxynaphthoic acid-anilide | Scarlet |
| 37 | Do | 2:3-hydroxynaphthoic acid-2'-naphthalide | Scarlet |
| 38 | Do | 2:3-hydroxynaphthoic acid-4'-methylanilide | Scarlet |
| 39 | Do | 2:3-hydroxynaphthoic acid-3'-chloranilide | Scarlet |
| 40 | Ethyl ester of 2'-methyl-2-amino-4-carboxylic acid-1:1'-diphenylether | 2:3-hydroxynaphthoic acid-2'-chloranilide | Red |
| 41 | Do | 2:3-hydroxynaphthoic acid-2':4'-dimethylanilide | Scarlet |
| 42 | Do | 2:3-hydroxynaphthoic acid - 2' - methoxy-5'-methylanilide | Scarlet |
| 43 | Methyl ester of 2-amino-4-carboxylic acid-1:1'-diphenylether | 2:3-hydroxynaphthoic acid-2'-methyl-4'-chloranilide | Red |
| 44 | Do | 2:3-hydroxynaphthoic acid-3'-nitranilide | Deep red |
| 45 | Do | 2:3-hydroxynaphthoic acid-2'-chloranilide | Red |
| 46 | Do | 2:3-hydroxynaphthoic acid-2'-methoxy-5'-chloranilide | Red |
| 47 | Do | 2:3-hydroxynaphthoic acid-2'-methylanilide | Red |
| 48 | Do | 2:3-hydroxynaphthoic acid-3'-methylanilide | Alizaraine-red |
| 49 | Do | 2:3-hydroxynaphthoic acid-4'-methylanilide | Red |

| | Diazo-component. | Coupling-component. | Shade |
|---|---|---|---|
| 50 | Methyl ester of 2-amino-4-carboxylic acid-1:1'-diphenylether | 2:3 - hydroxynaphthoic acid - 2' - methoxy - 5' - methylanilide | Alizarine-red |
| 51 | Do | 2:3-hydroxynaphthoic acid-2'-ethoxy-5'-methylanilide | Scarlet |
| 52 | Do | 2:3-hydroxynaphthoic acid-anilide | Red |
| 53 | Do | 2:3-hydroxynaphthoic acid-4'-chloranilide | Scarlet |
| 54 | Do | 2:3-hydroxynaphthoic acid-1'-naphthalide | Alizarine-red |
| 55 | Methyl ester of 2'-methyl-2-amino-4-carboxylic acid-1:1'-diphenylether | 2:3-hydroxynaphthoic acid-anilide | Red |
| 56 | Do | 2:3-hydroxynaphthoic acid-4'-chloranilide | Scarlet |
| 57 | Do | 2:3-hydroxynaphthoic acid-2'-methylanilide | Red |
| 58 | Do | 2:3-hydroxynaphthoic acid-4'-methylanilide | Red |
| 59 | Do | 2:3-hydroxynaphthoic acid-2'-methyl-4'-methoxyanilide | Red |
| 60 | Methyl ester of 4'-chloro-2-amino-4-carboxylic acid-1:1'-diphenylether | 2:3-hydroxynaphthoic acid-3'-methylanilide | Alizarine-red |
| 61 | Do | 2:3-hydroxynaphthoic acid-2'-methoxy-4'-chloranilide | Alizarine-red |
| 62 | Do | 2:3-hydroxynaphthoic acid-2'-methyl-5'-chloranilide | Red |
| 63 | Do | 2:3-hydroxynaphthoic acid-2'-methoxy-5'-methylanilide | Red |
| 64 | Methyl ester of 4'-chloro-2-amino-5-carboxylic acid-1:1'-diphenylether | 2:3-hydroxynaphthoic acid-4'-methylanilide | Scarlet |
| 65 | Do | 2:3-hydroxynaphthoic acid-4'-methoxyanilide | Scarlet |
| 66 | Do | 2:3-hydroxynaphthoic acid-anilide | Scarlet |
| 67 | Do | 2:3-hydroxynaphthoic acid-4'-chloranilide | Red |
| 68 | Do | 2:3-hydroxynaphthoic acid-α-naphthalide | Red |
| 69 | Do | 2:3-hydroxynaphthoic acid-β-naphthalide | Red |
| 70 | Ethyl ester of 4'-chloro-2-amino-5-carboxylic acid-1:1'-diphenylether | 2:3-hydroxynaphthoic acid-4'-methoxyanilide | Scarlet |
| 71 | Do | 2:3-hydroxynaphthoic acid-4'-methylanilide | Scarlet |
| 72 | Do | 2:3-hydroxynaphthoic acid-α-naphthalide | Red |
| 73 | Do | 2:3-hydroxynaphthoic acid-β-naphthalide | Red |
| 74 | Ethyl ester of 2-amino-4-chloro-1:1'-diphenylether-3'-carboxylic acid | 2:3-hydroxynaphthoic acid-para-chloranilide | Scarlet |
| 75 | Do | 2:3-hydroxynaphthoic acid-α-naphthalide | Red |
| 76 | Do | 2:3-hydroxynaphthoic acid-para-anisidide | Scarlet |
| 77 | Do | 2:3-hydroxynaphthoic acid-ortho-anisidide | Yellowish-scarlet |
| 78 | Do | 2:3-hydroxynaphthoic acid-para-toluidide | Scarlet |
| 79 | Do | 2:3-hydroxynaphthoic acid-2-methyl-4-anisidide | Red |
| 80 | Do | 2:3-hydroxynaphthoic acid-meta-chloranilide | Scarlet |
| 81 | Do | 2:3-hydroxynaphthoic acid-meta-toluidide | Do. |
| 82 | Do | 2:3-hydroxynaphthoic acid-para-xylidide | Do. |
| 83 | Do | 2:3-hydroxynaphthoic acid-2-methoxy-5-methylanilide | Do. |
| 84 | Ethyl ester of 2-amino-4-chloro-1:1'-diphenylether-4'-carboxylic acid | 2:3-hydroxynaphthoic acid-β-naphthalide | Red |
| 85 | Do | 2:3-hydroxynaphthoic acid ortho-anisidide | Scarlet |
| 86 | Do | 2:3-hydroxynaphthoic acid-para-phenetidide | Scarlet |
| 87 | Do | 2:3-hydroxynaphthoic acid-4'-chloro-2'-anisidide | Scarlet |
| 88 | Ethyl ester of 2-amino-4-chloro-1:1'-diphenylether-4'-carboxylic acid | 2:3-hydroxynaphthoic acid-meta-toluidide | Scarlet |
| 89 | Methyl ester of 2-amino-4-chloro-1:1'-diphenylether 4'-carboxylic acid | 2:3-hydroxynaphthoic acid-anilide | Scarlet |
| 90 | Do | 2:3-hydroxynaphthoic acid-β-naphthalide | Red |
| 91 | Do | 2:3-hydroxynaphthoic acid-para-anisidide | Red |
| 92 | Do | 2:3-hydroxynaphthoic acid-para-toluidide | Scarlet |
| 93 | Do | 2:3 - hydroxynaphthoic acid - 2':4' - dimethoxy - 5'-chloranilide | Red |
| 94 | Do | 2:3-hydroxynaphthoic acid-ortho-phenetidide | Scarlet |
| 95 | Methyl ester of 2-amino-1:1'-diphenylether-3'-carboxylic acid | 2:3-hydroxynaphthoic acid-para-chloranilide | Red |
| 96 | Do | 2:3-hydroxynaphthoic acid-meta-xylidide | Scarlet |
| 97 | Do | 2:3-hydroxynaphthoic acid-3':4'-dichloranilide | Red |
| 98 | Do | 2:3-hydroxynaphthoic acid-para-xylidide | Scarlet |
| 99 | Do | 2:3 - hydroxynaphthoic acid - 2' - methoxy - 5' - methylanilide | Do. |
| 100 | Ethyl ester of 2-amino-1:1'-diphenylether-3'-carboxylic acid | 2:3-hydroxynaphthoic acid-β-naphthalide | Do. |
| 101 | Do | 2:3-hydroxynaphthoic acid-5'-chloro-2'-toluidide | Yellowish-scarlet |
| 102 | Do | 2:3-hydroxynaphthoic acid-4'-chloro-2'-anisidide | Do. |
| 103 | Ethyl ester of 2-amino-1:1'-diphenylether-4'-carboxylic acid | 2:3-hydroxynaphthoic acid-para-anisidide | Red |
| 104 | Do | 2:3-hydroxynaphthoic acid-para-phenetidide | Red |
| 105 | Do | 2:3-hydroxynaphthoic acid-4'-chloro-2'-anisidide | Scarlet |
| 106 | Diethyl ester of 2-amino-1:1'-diphenylether-4:4'-dicarboxylic acid | 2:3-hydroxynaphthoic acid-para-chloranilide | Do. |
| 107 | Do | 2:3-hydroxynaphthoic acid-α-naphthalide | Do. |
| 108 | Do | 2:3-hydroxynaphthoic acid-β-naphthalide | Do. |
| 109 | Do | 2:3-hydroxynaphthoic acid-ortho-anisidide | Do. |
| 110 | Do | 2:3-hydroxynaphthoic acid-2':5'-dimethoxyanilide | Scarlet |
| 111 | Do | 2:3-hydroxynaphthoic acid-ortho-phenetidide | Do. |
| 112 | Do | 2:3-hydroxynaphthoic acid-ortho-chloranilide | Do. |
| 113 | Do | 2:3-hydroxynaphthoic acid-meta-xylidide | Do. |
| 114 | Do | 2:3-hydroxynaphthoic acid-2'-ethyl-5'-methylanilide | Red |

The formula of the dyestuff No. 14 is:—

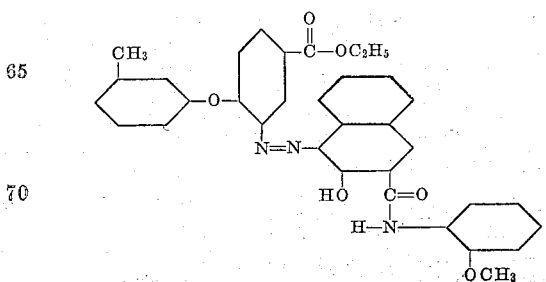

The formula of the dyestuff No. 106 is:—

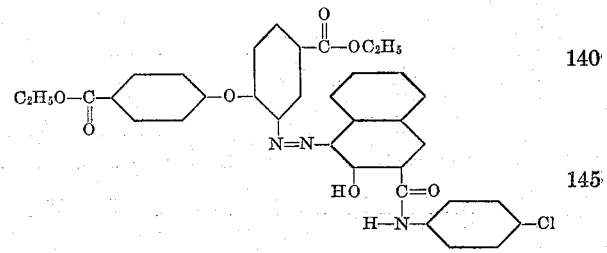

Particularly valuable are the tints which are obtained with the diazotizing components in which one of the two benzene nuclei contains a COO-alkyl group and the other a halogen atom, such as chlorine, fluorine, bromine or iodine.

When there is substituted for the diazo-components named another ester, such as the isopropylester or the normal butylester of the diazo-components, dyestuffs are obtained which are of similar purity and similar properties of fastness. Thus the diazotized normal butylester of 2-amino-1:1'-diphenylether-4'-chloro-4-carboxylic acid leads with the para-anisidide or the para-phenetidide of the 2:3-hydroxynaphthoic acid to scarlet tints of great vividness and fastness to light. In all the mentioned dyestuffs the chlorine atom may be replaced by another halogen, viz. fluorine, bromine or iodine.

Very pure dyestuffs are produced also when, instead of the esters of aliphatic alcohols, benzyl-, phenoyl,- tolyl-, methoxy- or ethoxy-phenylesters are used.

Similar results are obtained in piece dyeing or in printing. The dyestuff may also be produced upon other fibers, such as silk, artificial silk or the like, in which case, obviously, the details of operation given in the foregoing examples may have to be changed to suit the material, as is known from the pertinent literature.

When the dyestuffs are to be produced on wool the precautions prescribed in application Serial No. 356,620 or in application Serial No. 597,428 should be observed.

What I claim is:—

1. The azo-dyestuffs of the general formula

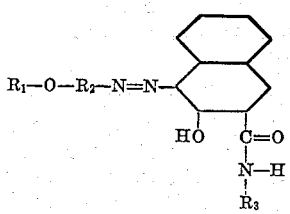

wherein $R_1$ stands for an aryl nucleus of the benzene series or an aralkyl radical, $R_2$ for an aryl nucleus of the benzene series, and $R_3$ for an aryl nucleus of the benzene or naphthalene series, wherein further the oxygen atom and the nitrogen atom of the two substituents of the benzene nucleus $R_2$ stand in ortho-position to each other, and wherein at least one of the two radicals $R_1$ and $R_2$ contains a COOX-group in which X means alkyl, which products are orange to red and brown powders, dissolve in pyridine to orange-red and blue-red solutions, and yield when produced on textiles, orange to red and blue-red tints of very good properties of fastness which tints are particularly characterized by their purity.

2. The azo-dyestuffs of the general formula

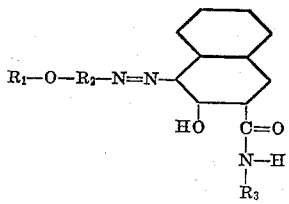

wherein $R_1$ stands for an aryl nucleus of the benzene series, $R_2$ for an aryl nucleus of the benzene series, and $R_3$ for an aryl nucleus of the benzene or naphthalene series, wherein further the oxygen atom and the nitrogen atom of the two substituents of the benzene nucleus $R_2$ stand in ortho-position to each other, and wherein at least one of the two radicals $R_1$ and $R_2$ contains a COOX-group in which X means alkyl, which products are orange to red and brown powders, dissolve in pyridine to orange-red and blue-red solutions, and yield when produced on textiles, orange to red and blue-red tints of very good properties of fastness which tints are particularly characterized by their purity.

3. The azo-dyestuffs of the general formula

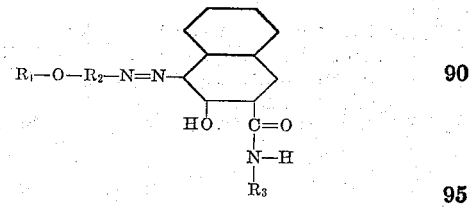

wherein $R_1$ stands for an aryl nucleus of the benzene series, $R_2$ for an aryl nucleus of the benzene series, and $R_3$ for an aryl nucleus of the benzene or naphthalene series, wherein further the oxygen atom and the nitrogen atom of the two substituents of the benzene nucleus $R_2$ stand in ortho-position to each other, and wherein one of the two radicals $R_1$ and $R_2$ contains a COO-alkyl group and the other a halogen atom, which products are orange to red and brown powders, dissolve in pyridine to orange-red and blue-red solutions, and yield when produced on textiles, orange to red and blue-red tints of very good properties of fastness which tints are particularly characterized by their purity.

4. The azo-dyestuffs of the general formula

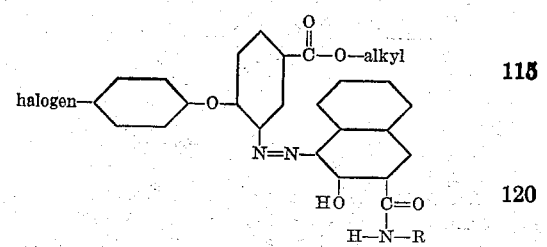

wherein R stands for an aryl nucleus of the benzene or naphthalene series, which products are orange to red and brown powders, dissolve in pyridine to orange-red and blue-red solutions, and yield when produced on textiles, orange to red and blue-red tints of very good properties of fastness which tints are particularly characterized by their purity.

5. The azo-dyestuffs of the general formula

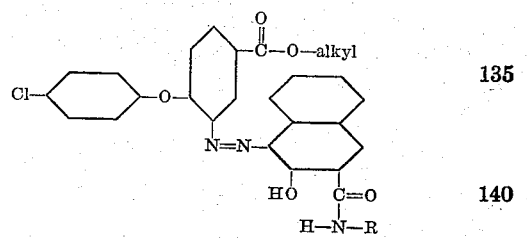

wherein R stands for an aryl nucleus of the benzene or naphthalene series, which products are orange to red and brown powders, dissolve in pyridine to orange-red and blue-red solutions, and yield when produced on textiles, orange to red and blue-red tints of very good properties of fastness which tints are particularly characterized by their purity.

6. The azo-dyestuff of the formula

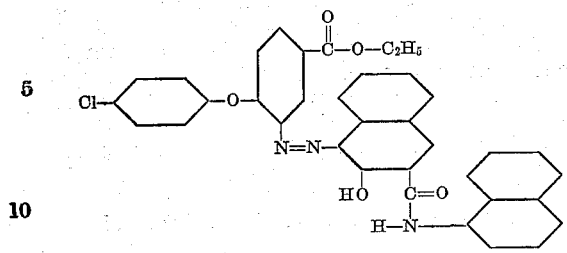

which product is a red powder, dissolves in pyridine to a red solution, and yields when produced on cotton, bluish tinged red shades of excellent properties of fastness and high purity.

7. The azo-dyestuffs of the general formula

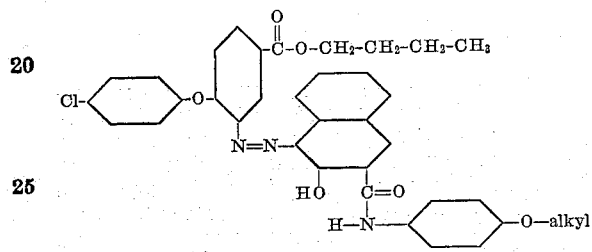

which products are red powders, dissolve in pyridine to red solutions, and yield when produced on cotton scarlet-red shades of excellent properties of fastness and high purity.

8. The azo-dyestuff of the general formula

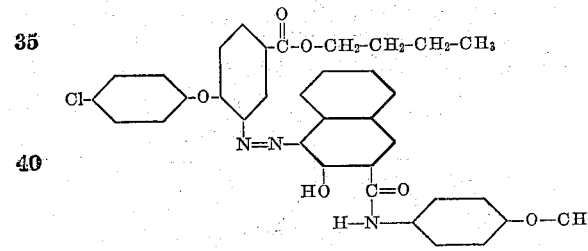

which product is a red powder, dissolves in pyridine to a red solution, and yields when produced on cotton scarlet-red shades of excellent properties of fastness and high purity.

9. The azo-dyestuffs of the general formula

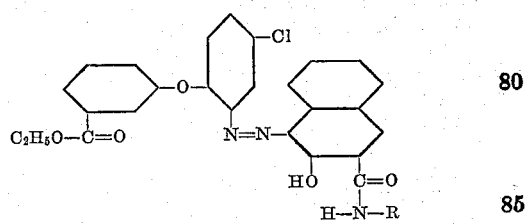

wherein R stands for an aryl nucleus of the benzene or naphthalene series, which products are orange to red and brown powders, dissolve in pyridine to orange-red and blue-red solutions, and yield when produced on textiles, orange to red and blue-red tints of very good properties of fastness which tints are particularly characterized by their purity.

10. The azo-dyestuff of the formula

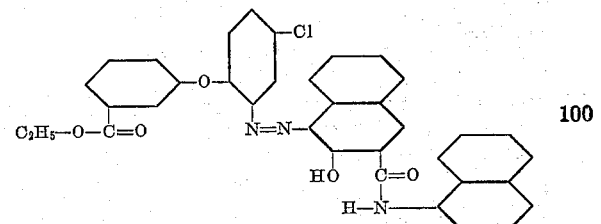

which product is a red powder, dissolves in pyridine to a red solution, and yields when produced on cotton, red shades of excellent properties of fastness and high purity.

11. Process for the production of azo-dyestuffs, consisting in coupling arylides of 2:3-hydroxynaphthoic acid with diazo-compounds of the general formula

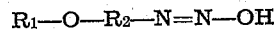

$R_1$—O—$R_2$—N=N—OH wherein $R_1$ stands for an aryl nucleus of the benzene series or an aralkyl radical, and $R_2$ for an aryl nucleus of the benzene series, wherein further at least one of the two radicals $R_1$ and $R_2$ contains a COO-alkyl group, and wherein the radicals $R_1$—O— and —N=N—OH stand in ortho-position to each other.

GÉRALD BONHÔTE.